Dec. 11, 1962  E. H. KINELSKI  3,067,508
METHOD OF FORMING BRAZED STRUCTURES
Filed July 23, 1959
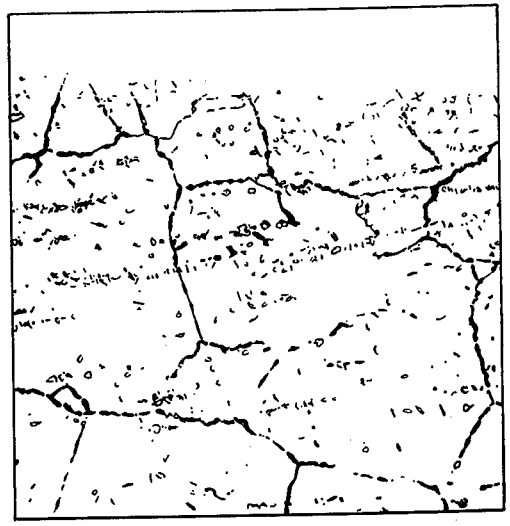
EUGENE H. KINELSKI
INVENTOR.
BY
ATTORNEY

United States Patent Office 3,067,508
Patented Dec. 11, 1962

3,067,508
METHOD OF FORMING BRAZED STRUCTURES
Eugene H. Kinelski, Berkeley Heights, N.J., assignor to The International Nickel Company, Inc., New York, N.Y., a corporation of Delaware
Filed July 23, 1959, Ser. No. 829,034
2 Claims. (Cl. 29—487)

The present invention relates to brazing and, more particularly, to filler compositions for furnace brazing of heat-resistant and/or corrosion-resistant metals which contain substantial amounts of nickel, chromium, molybdenum, tungsten, aluminum, titanium, niobium and/or similar elements of like characteristics.

Heretofore, the art has endeavored to provide brazing alloys having, in combination, a plurality of characteristics which would make them particularly suitable for furnace brazing of complex structures made of heat- and/or corrosion-resistant metals. A particularly pertinent example of a structure to be brazed is the so-called "honeycomb sections" now much in demand by the designers of supersonic and more esoteric vehicles.

To be completely satisfactory for use in brazing honeycomb sections, the brazing composition in the brazement must have high shear strength at both elevated and ambient temperatures. It must have a reasonable amount of ductility, a workable melting range and temperature, good flowing and wetting properties and a lack of aggressive alloying tendency toward the parent heat- and/or corrosion-resistant metals being joined. The composition must possess the inherent capability of being readily manufactured to produce a uniform and consistent product and, finally, it must be capable of being employed without an external flux in a commercially available atmosphere. Although heretofore attempts were made to provide a suitable brazing composition embodying all these characteristics in combination, none, as far as I am aware, was entirely successful when carried into practice commercially on an industrial scale.

It has now been discovered that by means of a specially restricted composition a brazing material can be provided which is particularly suitable for use in brazing complex structures made of heat- and/or corrosion-resistant metals and adapted to be employed at high temperatures under high stress.

The invention also contemplates providing a novel process for brazing heat-resistant and/or corrosion-resistant alloys.

Other objects and advantages will become apparent from the following description taken in conjunction with the accompanying drawing in which the figure is a pen and ink reproduction of a photomicrograph showing a section of alloy "X" (hereinafter defined) having a surface brazed with a filler alloy of the present invention. The original photomicrograph was taken at 500 magnification after the polished specimen had been etched electrolytically in 10% oxalic acid solution.

Broadly stated, the present invention contemplates a brazing filler composition containing about 35% to about 65% palladium, about 0.05% to about 1.0% lithium, about 0.002% to about 0.20% boron, up to about 40% chromium, up to about 5% iron, up to about 1.5% aluminum, up to about 0.3% carbon, up to about 0.3% manganese, up to about 0.3% silicon, up to about 20% copper, up to about 5% silver, up to about 0.5% niobium, up to about 1.5% titanium and the balance being essentially nickel and/or cobalt. At least about 24% nickel or cobalt must be present in the brazing filler composition. Advantageously, the balance of the composition is nickel. The filler composition can be an alloy or a physical mixture of metallic and/or metalloid components adapted to be alloyed in situ on a brazement. It is to be noted that the filler compositions of the present invention melt within a range of about 2150° F. to about 2300° F.

When the brazing filler composition is an alloy, it is advantageously made up by melting the ingredients in an inert atmosphere such as argon, helium, etc. In practice, an advantageous procedure for manufacturing the alloy comprises melting palladium with the other major ingredients, e.g., melting palladium with nickel under a blanket of argon. After the melt is thoroughly fused a portion of the lithium is added, boron or a boron containing addition agent is added to provide the required boron content and finally the remainder of the lithium is added. The alloys in accordance with the present invention form a molten bath which can be readily cast to provide a uniform and non-segregating product.

When the brazing filler composition is a physical mixture of powders, it is advantageously manufactured by employing a brittle lithium and boron master alloy or alloys, powdering said master alloy or alloys and thereafter mixing the powdered master alloy with powdered palladium and nickel. Advantageously, the powdered palladium is obtained from sponge palladium and the nickel powder is of the type sold commercially as carbonyl nickel powder type "B."

The present invention also contemplates a novel process of brazing which comprises, in essence, preplacing the novel brazing filler composition in association with a plurality of assembled parts to be joined, subjecting the assembly to the action of heat in the range of about 2150° F. to about 2300° F. in an inert atmosphere such as argon, helium, etc., and thereafter cooling said assembly to a temperature below at least about 1900° F. preferably in said atmosphere. Of course, it is understood that the metals to be brazed will not melt or substantially deform under the conditions of brazing. It is to be noted that the novel process of the invention is characterized by the fact that the parts to be joined can be made of heat- and/or corrosion-resistant alloys containing substantial amounts of elements such as chromium, molybdenum, tungsten, aluminum, titanium, niobium, etc. The process is further characterized by the fact that it is carried out at a workable temperature in an atmosphere of tank argon or other commercially available inert gas. A further advantageous characteristic of the process of the present invention is that under atmosphere and temperature conditions employed, no external flux is required and no special protective coating of the base metal, such a plating with nickel or iron, is required even when brazing the heat- and/or corrosion-resistant alloys normally specified by designers of supersonic vehicles.

In carrying the invention into practice, advantageous results are obtained when the brazing filler compositions are maintained within the ranges set forth in Table I.

Table I

| Element: | Range, percent |
|---|---|
| Palladium | 56–60 |
| Lithium | 0.05–0.5 |
| Boron | 0.002–0.02 |
| Aluminum | 0.5 max. |
| Carbon | 0.10 max. |
| Nickel | Balance |

It is to be noted that the range set forth in Table I requires a maximum limiting percentage of certain elements which can be present in the compositions of the present invention. If the maximum limiting percentage of these elements is exceeded, a number of factors must be considered. For example, if the aluminum level is high, then a greater amount of lithium and boron is required to provide self-fluxing characteristics. If the carbon level is too high, then carbon can diffuse into the base metal being brazed to form carbides which can be objectionable. If the lithium content is exceedingly low, then the boron level must be high. Conversely, if the boron is exceedingly low, then the lithium must be high to achieve satisfactory self-fluxing characteristics. Care must be taken that excessive amounts of boron are not employed, since excess boron can induce the formation of intermetallic compounds in the brazed structure. These intermetallic compounds can embrittle the joint.

Some brazing filler alloys in accordance with the present invention are set forth in Table II.

Table II

| Composition No. | Pd, percent | C, percent | Al, percent | Li, percent | B, percent | Ni, percent |
|---|---|---|---|---|---|---|
| A | 56.7 | 0.29 | 1.33 | 0.28 | 0.013 | 40.6 |
| B | 56.4 | 0.26 | 1.09 | 0.47 | 0.007 | Bal. |
| C | 53.9 | 0.014 | 0.80 | 0.35 | 0.015 | Bal. |
| D | 59.8 | 0.012 | 0.49 | 0.06 | 0.087 | Bal. |
| E | 57.3 | 0.24 | 0.63 | 0.60 | 0.002 | Bal. |
| F | 57.7 | 0.014 | 0.13 | 0.28 | 0.013 | Bal. |
| G | 53.5 | 0.09 | 0.91 | 0.41 | 0.0039 | Bal. |
| H | 59.1 | 0.28 | 0.83 | 0.43 | 0.0043 | Bal. |

A brazing powder mixture in accordance with the present invention identified as Composition "I" is set forth in Table III.

Table III

| Composition No. | Pd, percent | Li, percent | B, percent | Ni, percent |
|---|---|---|---|---|
| I | 60 | 0.28 | 0.013 | Bal.[1] |

[1] Including small amounts of incidental elements.

Advantageously, the brazing filler compositions of the present invention, such as set forth in Tables II and III, are employed in an argon atmosphere at temperatures about 2250° F.

When brazing heat- and/or corrosion-resistant alloys in accordance with the present invention, the novel brazing filler materials exhibit good wetting and flowing properties plus a desirable lack of aggressive alloying tendencies toward the parent metals being brazed. The brazements produced thereby also exhibit good oxidation and corrosion resistance. In order to assess the wetting and flowing characteristics of the brazing filler compositions of the present invention, a "T-joint" test was employed. The "T-joint" is made from two strips of a high-temperature heat- and/or corrosion-resistant alloy such as a nickel-chromium alloy which contains nominally about 73% nickel, about 15% chromium, about 7% iron, about 0.85% columbium and tantalum, about 0.8% aluminum, about 2.5% titanium, about 0.04% carbon, about 0.7% maganese and about 0.3% silicon. The strips 1/16-inch thick, 1 inch wide and 3 inches long, are held together as a right angle T by tack welding the end edges or by wiring the two strips together with nickel wire. Prior to brazing, the strips are sanded lightly with 600 grit silicon carbide paper, washed in soap and water and rinsed with alcohol. 0.25 gram of the brazing filler composition is placed at one end of the T and held in place by a drop or two of binder, e.g., an acrylic resin binder. The joints are then brazed without flux in a tank argon atmosphere at a temperature of about 2150° F. to 2300° F. The distance which the filler composition flows as a fillet in the joint during brazing is a measure of the flowability of the brazing filler. Experience dictates that, if, during this test the composition flows one inch or more, the composition has more than adequate flowability when employed under actual production conditions.

A series of "T-joint" tests as described above were made on the various brazing filler materials set forth in Tables II and III. The results of these tests are set forth in Table IV.

Table IV

| Composition No. | Base Metal | Temperature, ° F. | Length of Flow, inches |
|---|---|---|---|
| A | X[1] | 2,200 | 3 |
| B | X | 2,200 | 3 |
| C | X | 2,200 | 3 |
| D | X | 2,250 | 3 |
| E | X | 2,200 | 3 |
| F | X | 2,200 | 3 |
| G | X | 2,200 | 3 |
| H | X | 2,200 | 3 |
| I | X | 2,250 | 3 |
| D | Y[2] | 2,250 | 1½ |
| D | Z[3] | 2,250 | 1¼ |

[1] X alloy containing nominally 0.04% carbon, 0.7% manganese, 0.3% silicon, 15% chromium, 73% nickel, 0.9% columbium, 2.5% titanium, 0.9% aluminum and 7% iron.
[2] Y alloy containing nominally 0.13% carbon, 0.08% manganese, 0.25% silicon, 15% chromium, 46% nickel, 29% cobalt, 3.0% molybdenum, 2.2% titanium, 3.2% aluminum and 0.8% iron.
[3] Z alloy containing nominally 0.05% carbon, 0.5% manganese, 0.35% silicon, 13% chromium, 40% nickel, 6.0% molybdenum, 2.5% titanium, 0.20% aluminum and the balance iron.

It is to be noted that each of the compositions of the present invention exhibited a flow of greater than one inch under the test conditions as set forth in Table IV. In contrast, some brazing alloys of the prior art, the compositions of which are set forth in Table V, exhibit flowing characteristics as set forth in Table VI.

Table V

| Alloy No. | Percent Pd | Percent Ni | Percent B | Percent Ag | Percent Mn | Percent Si | Percent Cr | Percent Fe | Percent C | Percent Al |
|---|---|---|---|---|---|---|---|---|---|---|
| 1 | 61.1 | Bal. | 0.002 | | | | | | 0.04 | <0.1 |
| 2 | 20 | | | 75 | 5 | | | | | |
| 3 | 33 | | | 64 | 3 | | | | | |
| 4 | 21 | 48 | | | 31 | | | | | |
| 5 | | 66.66 | | | 0.89 | 10.34 | 18.92 | 2.87 | 0.19 | 0.04 |
| 6 | | 70 | 4 | | | 4 | 17 | 4 | 1 | |

Table VI

| Alloy No. | Base Metal | Brazing Temp., ° F. | Length of Flow, inches |
|---|---|---|---|
| 1 | X | 2,250 | 0 |
| 2 | X | 2,050 | 0 |
| 3 | X | 2,250 | 0 |
| 4 | X | 2,100 | 0 |
| 5 | X | 2,100 | 0 |
| 6 | X | 2,050 | 0 |

It is to be observed that under the testing conditions, the alloys of the prior art completely failed to flow. On the contrary, the compositions of the present invention exhibited excellent flowing properties on metals not readily wet by the brazing filler alloys of the prior art.

A brazement of alloy "X" (nominally 73% nickel, 15% chromium, 2.5% titanium, 0.9% columbium, 7% iron, 0.9% aluminum, 0.7% manganese, 0.3% silicon and 0.04% carbon) wherein a cylinder having an inside diameter of 0.5 inch is brazed to a plug having a slightly smaller diameter which was made in accordance with the present invention with brazing filler composition No. A, exhibited an average short time tensile shear strength at 1200° F. of about 30,530 pounds per square inch (p.s.i.). This short time tensile shear strength compares favorably with the published values obtained with the strongest but aggressive and brittle prior art brazing filler alloys when said filler alloys are employed to braze similar specimens of alloy "X" in the various recommended manners, e.g., in the presence of borax flux and/or with the use of preplated surfaces. It is to be observed, however, that the prior art brazing filler alloys, as exemplified by the alloys set forth in Table V, do not have sufficiently satisfactory wetting and flowing characteristics to enable them to be employed on heat- and/or corrosion-resistant metals without flux in an inert atmosphere. In contrast, the brazing filler compositions of the present invention exhibit excellent flow on such metals and can even be employed to surface said metals.

It is to be noted that the novel brazing filler compositions of the present invention do not exhibit aggressive tendencies toward the parent metals being brazed. The FIGURE in the accompanying drawing is clearly illustrative of this. Referring now thereto, it is to be noted that the brazing alloy, i.e., alloy "D" (represented by the blank area in the upper portion of the outline), has not penetrated the base metal "X" (represented by the lined area in the lower portion of the outline). As mentioned hereinbefore, the figure is a pen and ink reproduction of a photomicrograph of a section through alloy "X" and composition "D" viewed at 500 power magnification after etching electrolytically with 10% oxalic acid. A further advantage of the brazing filler compositions of the present invention is that the brazements produced therewith are ductile.

With respect to the novel brazed product and the process of the present invention, it is to be observed that the terms "heat-resistant and/or corrosion-resistant metals" are used to include austenitic nickel-chromium alloys, including nickel-chromium-iron and nickel-chromium-cobalt alloys, and cobalt-chromium alloys, including cobalt-chromium-iron alloys, which contain a total of at least 25% nickel plus chromium, cobalt plus chromium or nickel plus chromium plus cobalt (i.e., a total of at least about 25% of chromium plus nickel and/or cobalt), in addition to small amounts of aluminum, titanium, molybdenum, tungsten, niobium, tantalum, silicon, manganese, zirconium, and boron with the balance iron, if any, which are present in the alloys.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process for producing brazed structures which comprises preplacing a brazing filler composition containing about 35% to 65% palladium, about 0.05% to 1.0% lithium, about 0.002% to about 0.2% boron, with the balance essentially at least one metal selected from the group consisting of cobalt and nickel in association with a plurality of assembled components made of an alloy containing at least 25% of chromium and metal from the group consisting of nickel and cobalt with the balance essentially iron, subjecting the assembled components and the brazing filler composition to the action of heat in the range of about 2150° F. to about 2300° F. in an atmosphere substantially devoid of oxygen and thereafter cooling said assembled components to a temperature below at least about 1900° F. in said atmosphere.

2. A process for producing brazed structures which comprises preplacing brazing filler composition containing about 56% to 60% palladium, about 0.05% to 0.5% lithium, about 0.002% to 0.02% boron, up to 0.5% aluminum, up to 0.1% carbon, and the balance essentially nickel in association with a plurality of assembled components made of an alloy containing at least 25% of chromium and metal from the group consisting of nickel and cobalt with the balance essentially iron, subjecting the assembled components and the brazing filler composition to the action of heat in the range of about 2150° F. to about 2300° F. in an atmosphere substantially devoid of oxygen and thereafter cooling said assembled components to a temperature below at least about 1900° F. in said atmosphere.

References Cited in the file of this patent

UNITED STATES PATENTS

| | | |
|---|---|---|
| 1,832,307 | Kingsbury | Nov. 17, 1931 |
| 2,050,077 | Wise | Aug. 4, 1936 |
| 2,066,870 | Wise | Jan. 5, 1937 |
| 2,070,451 | Powell | Feb. 9, 1937 |
| 2,269,497 | Vilensky | Jan. 13, 1942 |
| 2,844,867 | Wernz | July 29, 1958 |
| 2,850,798 | Bowman | Sept. 9, 1958 |
| 2,903,352 | Bredzs | Sept. 8, 1959 |